G. E. LACKEY.

CURTAIN.

APPLICATION FILED FEB. 4, 1914.

Reissued Oct. 20, 1914.

13,811.

2 SHEETS—SHEET 1.

Witnesses:
C. W. Benjamin
A. B. Dollard

Inventor
George E. Lackey
By his Attorney
Charles G. Hensley.

THE NORRIS PETERS CO., PHOTO-LITHO., WASHINGTON, D. C.

G. E. LACKEY.

CURTAIN.

APPLICATION FILED FEB. 4, 1914.

Reissued Oct. 20, 1914.

13,811.

2 SHEETS—SHEET 2.

Witnesses:
C. W. Benjamin
A. B. Dollard.

Inventor
George E. Lackey
By his Attorney
Charles G. Wensley

THE NORRIS PETERS CO., PHOTO-LITHO., WASHINGTON, D. C.

UNITED STATES PATENT OFFICE.

GEORGE E. LACKEY, OF NEW YORK, N. Y., ASSIGNOR TO INTERNATIONAL LACE COMPANY, OF NEW YORK, N. Y., A CORPORATION OF NEW YORK.

CURTAIN.

13,811. Specification of Reissued Letters Patent. Reissued Oct. 20, 1914.

Original No. 1,050,841, dated January 21, 1913, Serial No. 710,225. Application for reissue filed February 4, 1914. Serial No. 816,634.

*To all whom it may concern:*

Be it known that I, GEORGE E. LACKEY, a citizen of the United States, and a resident of the city, county, and State of New York, have invented certain new and useful Improvements in Curtains, of which the following is a specification.

My invention relates to curtains such as are used for windows and more particularly to curtains having a valance.

The object of my invention is to provide a valance curtain which will drape or hang in the most desirable manner and which will remain in proper draped position when once hung.

My object is to arrange the curtain and its valance so that the valance will hang down straight without folds, while the curtain will drape in folds or curves, in a most artistic and pleasing manner; and the curtain with its valance is so made that the desired effect will be produced by simply arranging the same upon its support in the manner required by its construction; so that means other than the curtain and its support are not required to produce the desired effect. The device is so made that, when once hung, the curtain and valance will always hang in the desired manner.

Another object of my invention is to produce a curtain of the above character which will add little or nothing to the ordinary cost of a curtain and in which unsightly devices will not be required to produce the desired effect.

I accomplish the above objects by a novel arrangement of the apertures or slots through which the curtain or similar support is passed, so that the desired effects will result from such arrangement.

Figures 1, 2:
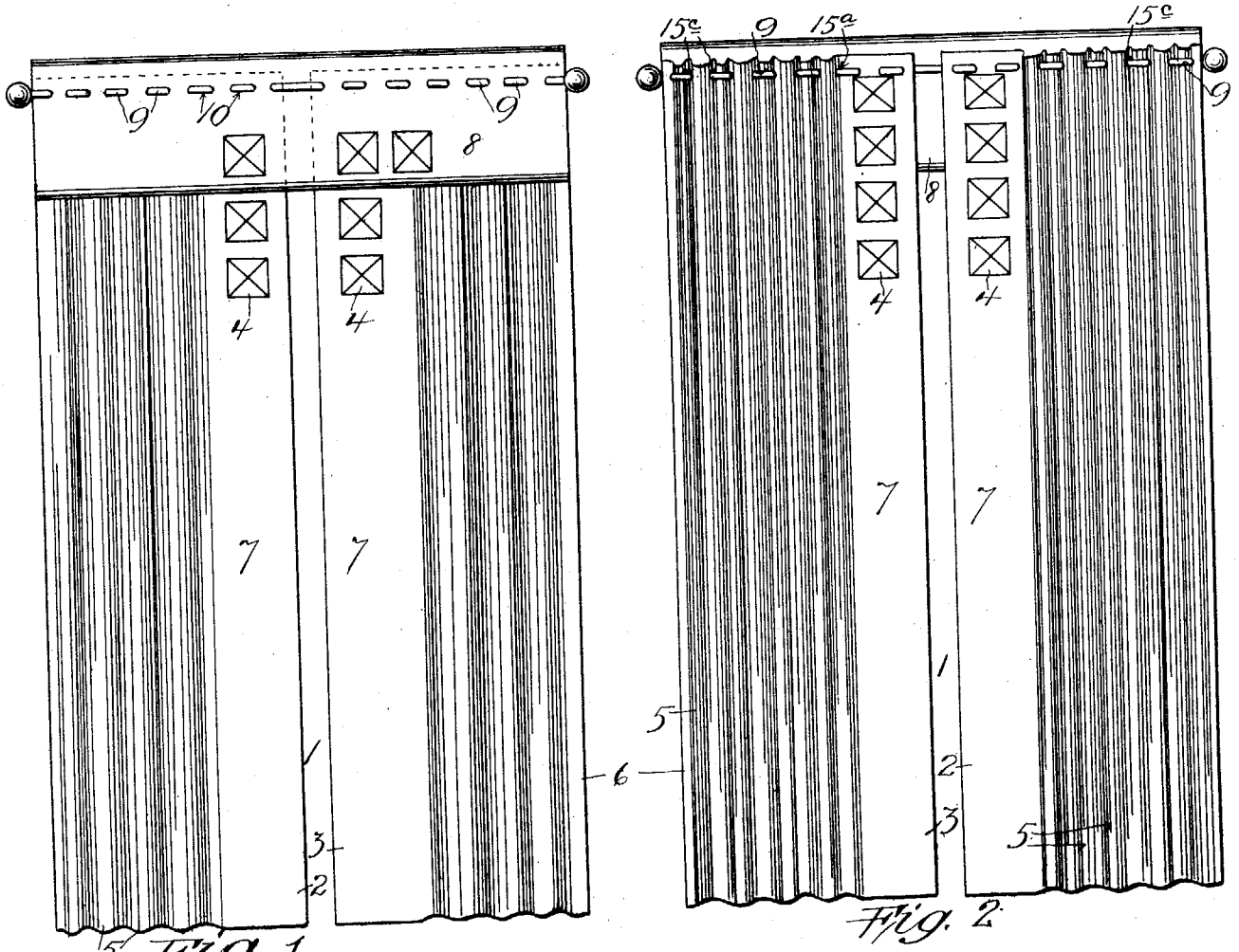
Figure 3:
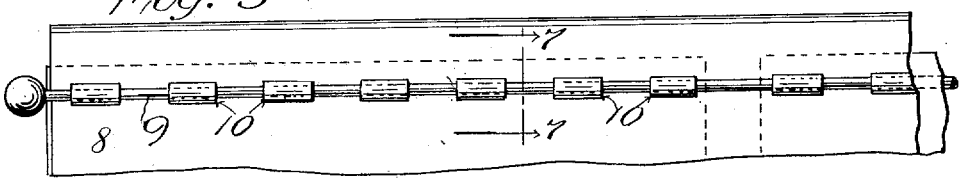
Figure 4:
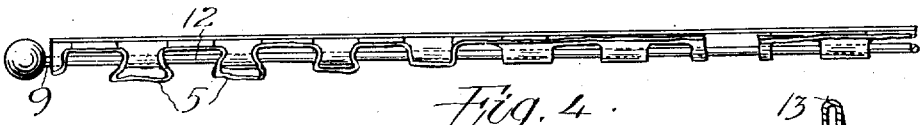
Figure 8:
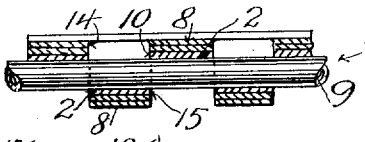
Figure 7:
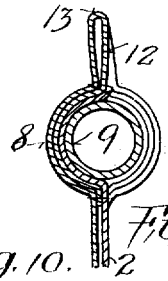
Figure 9:
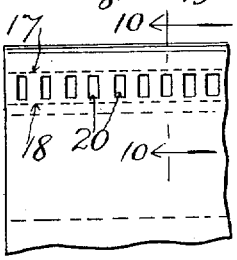
Figure 9A:
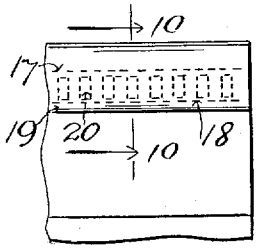
Figure 10:
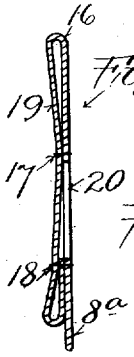
Figure 11:
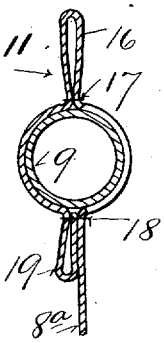
Figure 5:
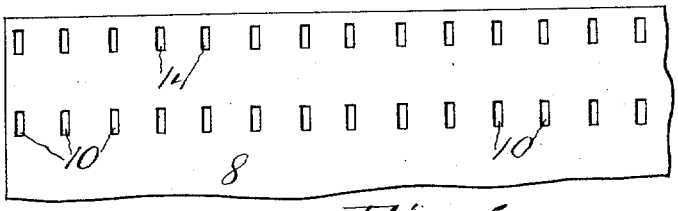
Figure 6:
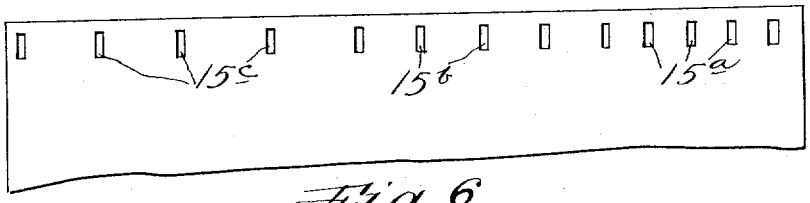

In the drawing forming a part of this application, Figure 1 is a front elevation of a valance curtain, embodying my invention, and showing the artistic effect which may be produced under my invention, Fig. 2 is a rear elevation thereof, Fig. 3 is an enlarged elevation of a portion of the curtain and valance, Fig. 4 is a plan view thereof, Fig. 5 is an elevation of a portion of the upper half of the valance, showing one arrangement of the apertures, Fig. 6 is a similar view of one of the curtain panels, Fig. 7 is a sectional view, taken on the line 7—7 of Fig. 3, Fig. 8 is a longitudinal sectional view, taken through the curtain and valance where the supporting member or rod passes through them, Figs. 9 and 9[a] are front and rear elevations showing another form of valance, Fig. 10 is a sectional view thereof, taken on the line 10—10 of Fig. 9, and Fig. 11 is a similar sectional view showing the curtain rod in the valance.

As previously stated, my invention relates to a valance curtain, and it may be used in connection with lace or similar curtains for decorating windows, or it may be used in connection with portières or other similar draperies. The curtain proper is preferably made in separate halves or panels, and the valance is preferably, though not necessarily, formed separately from the curtain and in one piece, that is, coextensive (when draped), with the width of the entire curtain. In either case, however, the curtain and valance are both arranged upon the same support, and the desired effect is produced by reason of the relative arrangement of the curtain, valance and support.

In Figs. 1 and 2, I have shown a curtain 1, formed of separate panels 2, 3, which may be made of lace, scrim, or any other material of which curtains or draperies are usually made. They may have a border decoration 4 or they may be plain, or be entirely covered with a design, the decorative character of the material forming no part of my invention. The most pleasing and artistic effects are produced when the curtain 1, is draped so that it falls in one or a number of folds or longitudinal curves 5. These folds or curves may be caused to form either near the outer edges 6, of the curtain, or at any desired location, but preferably they form from the outer edges to a line near the border 4, leaving a plain or smooth portion 7 near the middle line of the curtain. On the other hand it is desirable that the valance 8 hang without folds or curves, or in a flat plane from end to end. In the ordinary method of constructing and supporting valance curtains it has been found impracticable to arrange the curtain proper in folds or curves and the valance straight, especially when both curtain and valance were arranged upon the same support, because the tendency of the valance was always to form in folds wherever the curtain formed in folds; and therefore the desired effect could not be produced. In the present case I support both curtain and valance upon the same horizontal support, which may be any support usually employed for such purpose, but which is herein shown as an ordinary curtain rod 9, which may be supported upon the usual brackets used for such purposes.

The valance 8, as shown in Fig. 5, is provided with a number of apertures or slots 10, of suitable size to receive the rod 9; so that the latter may be passed therethrough in alternate relation. That is, the rod may be passed from front to back through one such aperture; and from back to front through the one next thereto; and so on, throughout the length of the valance. These apertures 10 are arranged equal distances apart throughout the valance and they are preferably the same in number as the corresponding apertures in the curtain as a whole. There may be a difference in the space, at the middle of the valance, where the curtain is formed of separate halves, so that the curtain will separate at the middle. Where it is desired to form a loop or heading 12 upon the upper edge of the valance, by folding the same back upon itself along the line 13 a second row of apertures 14 is formed near the top edge of the valance, through which the rod 9 may also be passed. The apertures 14, in such case, will be arranged in vertical alinement with the apertures 10, in order that the rod may pass through apertures 10 and 14 at the same places.

Where the curtain 1 is formed of two separate halves or panels 2, 3, each of the latter will have a line of apertures 15 near the upper edge. The apertures are preferably not all spaced the same distance apart as the apertures 10. At least some of the apertures 15 are preferably spaced a greater distance apart than the apertures 10, while others may, if desired, be spaced the same as the latter. For instance, if it is desired to have the folds or curves 5 of the panels 2, 3, near the outer edges, and straight or plane portions 7 near the middle of the curtain, then apertures $15^a$ near the border portion 7 will be spaced apart the same distance as the apertures 10; while the remaining apertures of the row 15 will be spaced a greater distance apart. All of the remaining apertures of the row 15 will be spaced a greater distance apart. All of the remaining apertures may be arranged a greater distance apart than the apertures $15^a$ and themselves equal or different distances apart, according to whether the folds 5 are to be of equal widths. For instance, the apertures $15^b$ may be spaced farther apart than apertures $15^a$; while the remaining apertures $15^c$ of the row, may be spaced equally apart, but a greater distance than the distance between the apertures $15^a$ or between apertures $15^b$. Preferably, the valance has the same number of apertures 15 as the curtain which it overlies.

Where it is desired to have the decorative loop or heading 12 at the top of the valance, the latter is turned back upon itself between the rows of apertures 10 and 14, to bring the apertures of both rows opposite each other. The curtain and valance may be arranged upon the rod by passing the latter back and forth through the several apertures in the manner shown in the drawings. If the rod is inserted first from the front, as shown in the drawings, it will be passed through the aperture 10 nearest one edge of the valance, thence through the aperture 14 in line therewith; and thence through the aperture $15^c$ nearest the edge of say curtain member 2. The rod will pass from the latter aperture, behind the curtain and will be returned to the front thereof through the second aperture $15^c$, the second aperture 14, and the second aperture 10. From the latter the rod will pass across the front of the valance to the third aperture 10. This operation is repeated until the rod has been passed back and forth through all the apertures in curtain member 2. The same operation is continued across the second half of the valance, and the member 3. Since the rod passes through apertures 10, 14, and also each time through an aperture in row 15, the latter apertures will necessarily come opposite the apertures 10. But since the apertures $15^c$, $15^b$, were formed greater distances apart than apertures 10, loops, curves, or folds 5 will necessarily form in the curtain, between apertures $15^c$ and $15^b$ when the latter are retained in line with apertures 10. These curves or folds will extend down the length of the curtain and produce the effect desired. The valance, however, will be straight across, because there will not be sufficient material between the apertures 10 (and 14) for the valance to follow the folds of the curtain. The desired effect will therefore be obtained as a result of the arrangement of the parts as herein shown. The location of the curves or folds 5 will always remain the same, and they will be determined by the arrangement of apertures $15^c$, $15^b$. The folds 5 will always be present because the valance will prevent the curtain from sliding along the rod between apertures 10.

In Figs. 9, $9^a$, 10 and 11 I have shown a somewhat different construction of the valance, whereby the curtain support or rod may be entirely hidden from view in the front. In this construction the valance $8^a$ is turned back upon itself along the top edge, to form a heading 16. Separated rows 17 and 18 of stitches secure the turned down portion 19 to the valance. Instead of providing the double row of apertures as in Fig. 5, I provide, in this form, only one row of regularly spaced apertures 20, which are formed, preferably, only in the turned down portion 19 and between the rows of stitches 17 and 18. The curtain may be the same as in the previous form. The curtain support or rod will be passed back and forth through the apertures of the curtain and through the apertures 20, but the rod will not come to the front of the curtain as it will be hidden by the valance 8[a].

All the advantages of the former construction may be preserved. It will be understood that the number and location of the curtain folds may be varied. This feature may be used separately from the others, if desired. That is, the curtain may be made at the top according to the showing in Figs. 9 to 11 and it may be placed on the rod in the manner shown and without a valance. The advantage of this arrangement, when separately used, over ordinary curtains is, that the curtain will shir along the rod evenly and the rod will be hidden from view at the front of the curtain. The curtain will have an uninterrupted effect right to the extreme top.

While I have described what I consider the best form of my invention I do not intend thereby to limit my invention to that form, as I deem all devices within the scope of my invention, which embody the subject matter of the annexed claims.

What I do claim as my invention, and desire to secure by Letters Patent, is—

1. A device of the character described, comprising a curtain and a valance therefor, said valance having a plurality of apertures across the same, and said curtain having a plurality of apertures across the same at least a plurality of said latter apertures being spaced a greater distance apart than corresponding apertures in said valance, for the purpose set forth.

2. A device of the character described, comprising a curtain and a valance therefor, said valance having a plurality of rows of apertures across the same near one edge, the apertures in said rows being arranged in vertical alinement, and said curtain having a plurality of apertures across the top thereof, at least a plurality of said latter apertures being spaced a greater distance apart than corresponding apertures in said valance, for the purpose set forth.

3. A device of the character described, comprising a curtain composed of separate halves, and a valance for the curtain, said valance having apertures across the same, spaced apart equal distances, and said curtain halves each having a row of apertures across the same, part of which are spaced apart equal distances to the apertures in said valance, and others spaced apart greater distances than said valance apertures, for the purpose set forth.

4. A device of the character described, comprising a curtain and a valance, said valance having a row of equally spaced apertures, said curtain having a row of apertures, at least a plurality of which are spaced apart a greater distance than said valance apertures, and a supporting member passing alternately through said valance apertures and alternately through said curtain apertures corresponding with its passages through said valance apertures, whereby said curtain will be caused to hang in folds or curves.

5. A device of the character described, comprising a curtain and a valance, said valance having its upper edge turned down upon the valance, rows of stitches securing the turned down portion to the valance, said turned down portion having apertures arranged between said rows of stitches, said curtain having a row of apertures, at least a plurality of which are spaced greater distances apart than the apertures in said valance, and means passing through said apertures for supporting the curtain and valance.

6. A device of the character described, comprising a fabric adapted for the purpose set forth, having apertures near the top thereof through which a pole or other support may be passed to shir the fabric thereon, said fabric having a heading turned down and secured thereto and covering said apertures.

7. A device of the character described, comprising a fabric adapted for the purpose set forth, having apertures near the top thereof through which a pole or other support may be passed to shir the fabric thereon, said fabric having a heading turned down and covering said apertures and secured to the fabric above and below said apertures.

Signed at the city, county and State of New York, this 31st day of January, 1914.

GEO. E. LACKEY.

Witnesses:
C. W. KEUNEKE,
CHARLES G. HENSLEY.

Copies of this patent may be obtained for five cents each, by addressing the "Commissioner of Patents, Washington, D. C."